United States Patent
Trenholm et al.

(10) Patent No.: US 10,393,503 B2
(45) Date of Patent: Aug. 27, 2019

(54) STEERABLE FOCAL ADJUSTMENT FOR OPTICAL COHERENCE TOMOGRAPHY

(71) Applicant: SIGHTLINE INNOVATION INC., Toronto (CA)

(72) Inventors: Wallace Trenholm, Toronto (CA); Lorenzo Pons, Toronto (CA)

(73) Assignee: SIGHTLINE INNOVATION INC., Toronto (CA)

( * ) Notice: Subject to any disclaimer, the term of this patent is extended or adjusted under 35 U.S.C. 154(b) by 0 days.

(21) Appl. No.: 16/006,032

(22) Filed: Jun. 12, 2018

(65) Prior Publication Data

US 2019/0137256 A1  May 9, 2019

Related U.S. Application Data

(60) Provisional application No. 62/518,227, filed on Jun. 12, 2017.

(51) Int. Cl.
*G01B 11/24* (2006.01)
*G01B 9/02* (2006.01)

(52) U.S. Cl.
CPC ...... *G01B 9/02091* (2013.01); *G01B 11/2441* (2013.01)

(58) Field of Classification Search
CPC .............. G01B 9/02091; G01B 11/2441
See application file for complete search history.

(56) References Cited

U.S. PATENT DOCUMENTS

| 7,595,892 B2* | 9/2009 | Judell | G01B 11/2441 356/511 |
| 7,869,057 B2* | 1/2011 | De Groot | G01B 9/02044 356/511 |
| 2004/0027576 A1* | 2/2004 | De Groot | G01B 11/2441 356/498 |
| 2011/0304856 A1* | 12/2011 | Ge et al. | G01B 11/2441 356/511 |

* cited by examiner

*Primary Examiner* — Jonathan M Hansen
(74) *Attorney, Agent, or Firm* — Mark Lampert; Anil Bhole; Bhole IP Law

(57) ABSTRACT

A system and method for surface inspection of an object using optical coherence tomography (OCT) is provided. The method includes determining a surface profile of the object, the surface profile includes one or more regions on a surface of the object; moving the object relative to the OCT scanner head; and for each of the one or more regions on the surface of the object, performing: determining a working distance where the surface of the object at the respective region is within a present depth of field; determining an angle where the respective region is at the determined working distance from an OCT scanner head; directing the OCT scanner head at the determined angle towards the respective region when the respective region is at the determined working distance along the respective angle; and performing an A-scan of the object when the respective region is within the present depth of field.

20 Claims, 15 Drawing Sheets

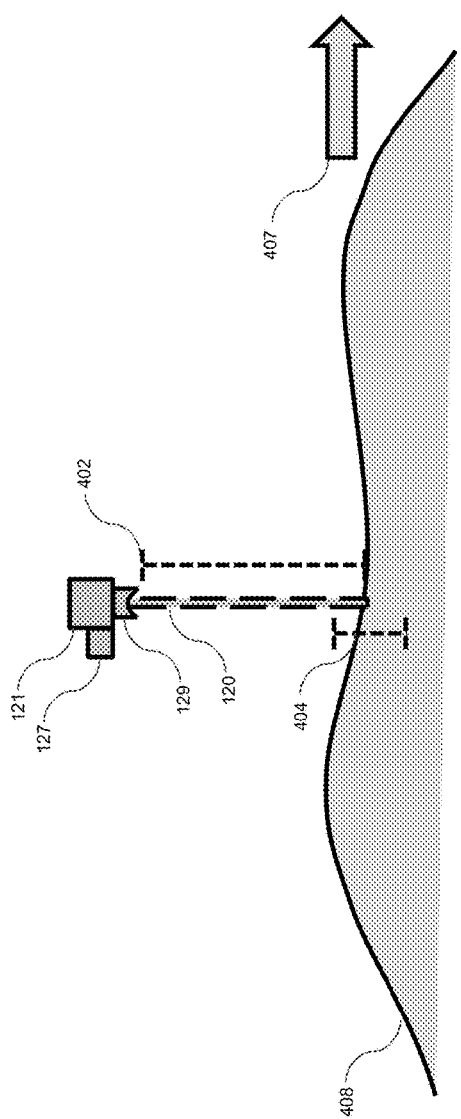
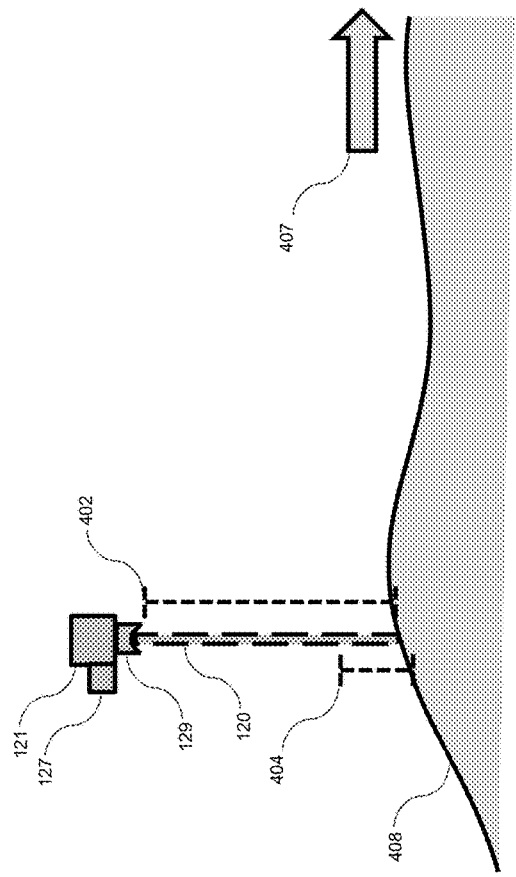

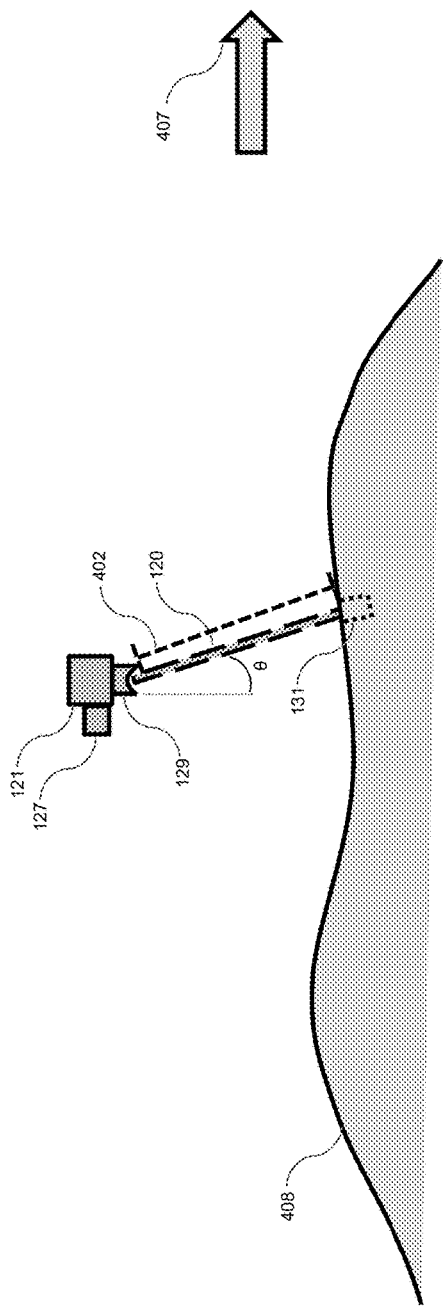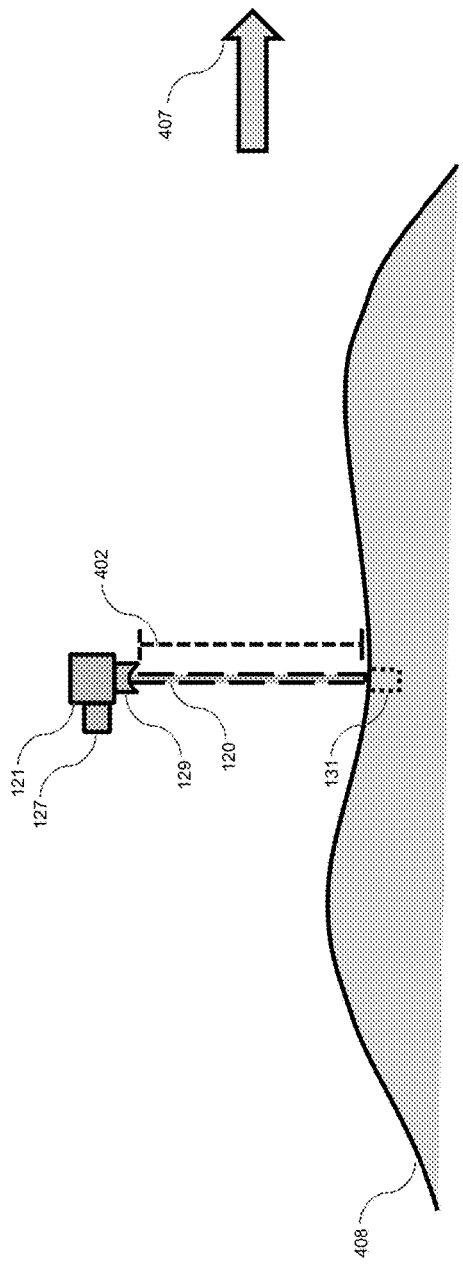

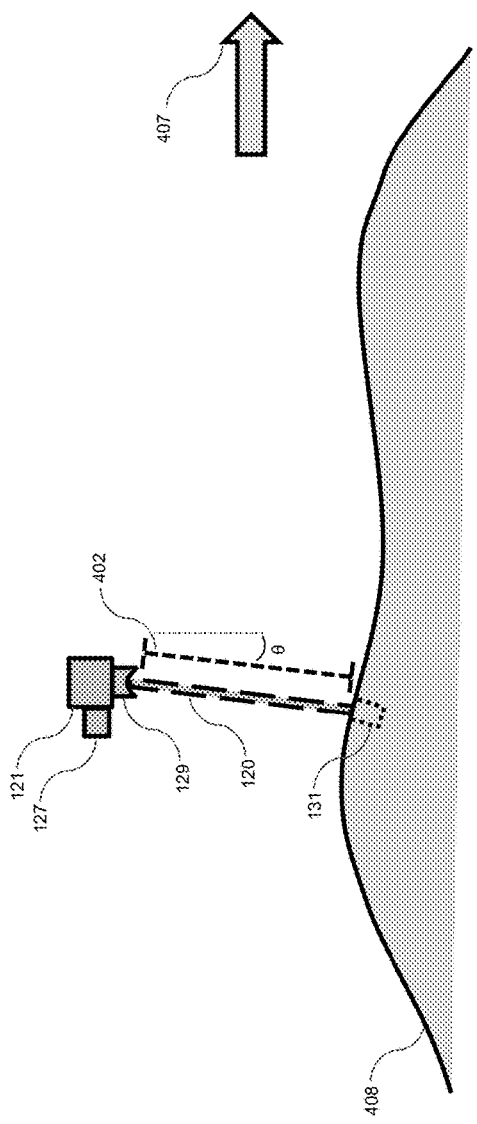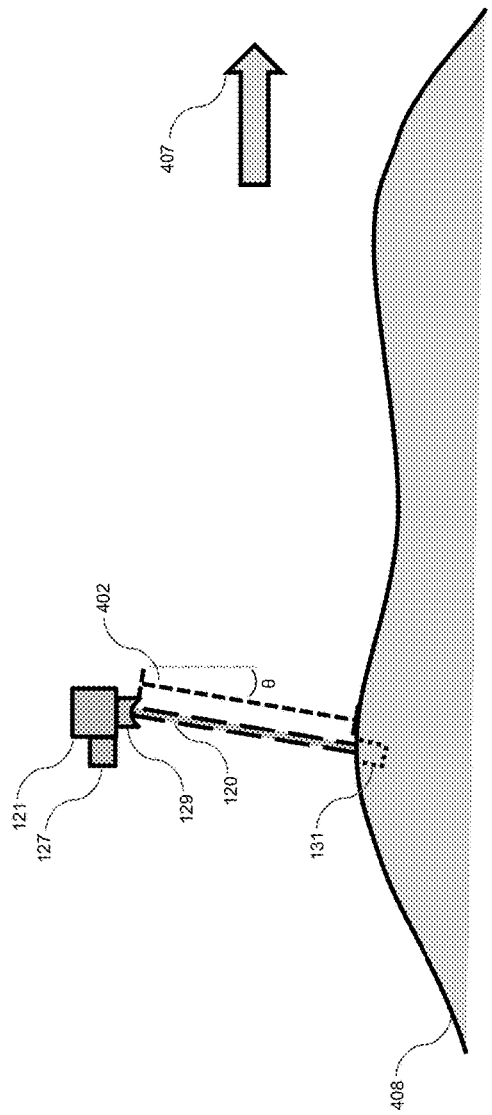

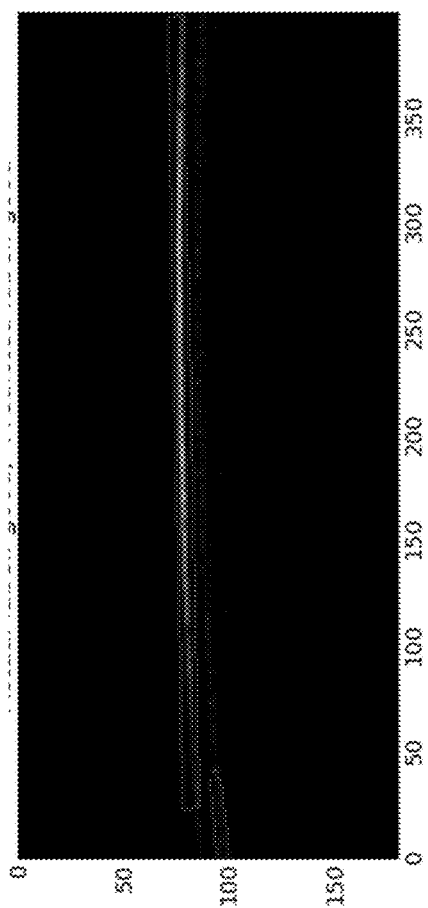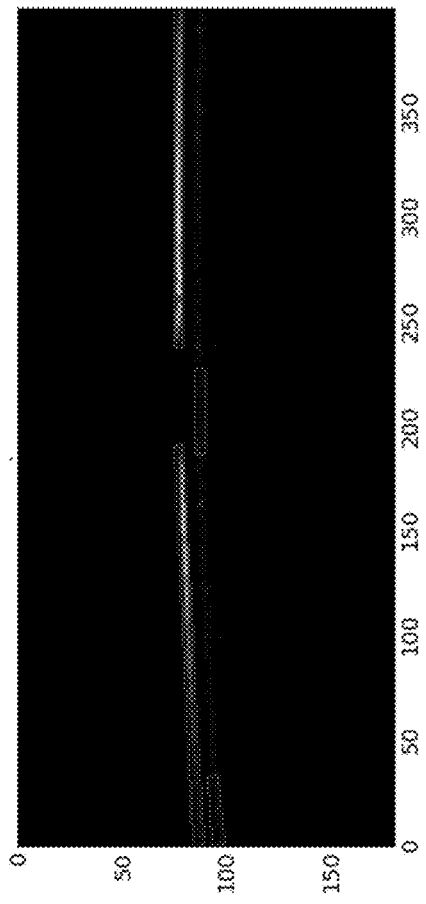
FIG. 8A
FIG. 8B

STEERABLE FOCAL ADJUSTMENT FOR OPTICAL COHERENCE TOMOGRAPHY

TECHNICAL FIELD

The following relates generally to imaging and more specifically to a system and method for steerable focal adjustment for optical coherence tomography.

BACKGROUND

In many applications, imaging can be used to garner information about a particular object; particularly aspects about its surface or subsurface. One such imaging technique is tomography. A device practicing tomography images an object by sections or sectioning, through the use of a penetrating wave. Conventionally, tomography can be used for various applications; for example, radiology, biology, materials science, manufacturing, quality assurance, quality control, or the like. Some types of tomography include, for example, optical coherence tomography, x-ray tomography, positron emission tomography, optical projection tomography, or the like.

Conventionally, the above types of tomography, and especially optical coherence tomography, produce detailed imaging of an object; however, inaccuracies and problems can arise with respect to properly imaging the object.

SUMMARY

In an aspect, there is provided a method of surface inspection of an object using optical coherence tomography (OCT), the method comprising: determining a surface profile of the object, the surface profile comprising one or more regions on a surface of the object; moving the object relative to the OCT scanner head; and for each of the one or more regions on the surface of the object, performing: determining a working distance where the surface of the object at the respective region is within a present depth of field; determining an angle where the respective region is at the determined working distance from an OCT scanner head; directing the OCT scanner head at the determined angle towards the respective region when the respective region is at the determined working distance along the respective angle; and performing an A-scan of the object when the respective region is within the present depth of field.

In a particular case, moving the object relative to the OCT scanner head comprises continuously moving the object.

In another case, the one or more regions on the surface of the object comprise one or more regions in a first section of the surface profile, the surface profile comprising at least one subsequent section, each subsequent section comprising one or more subsequent regions, the method further comprising, for each one of the one or more subsequent regions, performing: determining a working distance where the surface of the object at the respective subsequent region is within the present depth of field; determining an angle where the respective subsequent region is at the determined working distance from the OCT scanner head; directing the OCT scanner head at the determined angle towards the respective subsequent region when the respective subsequent region is at the determined working distance along the respective angle; and performing an A-scan of the object when the respective subsequent region is within the present depth of field.

In yet another case, at least a portion of the object has a curved surface profile.

In yet another case, determining the surface profile of the object comprises measuring a plurality of distances between a fixed point and the surface of the object.

In yet another case, the method further comprising retrieving a surface geometry of the object from a database and wherein determining the surface profile of the object comprises determining a distance between the scanner head and the surface of the object from the surface geometry of the object.

In yet another case, the one or more regions are approximately 100 to 1000 microns away from an adjacent region.

In yet another case, the one or more regions are approximately 200 microns away from the adjacent region.

In yet another case, the angle where the respective region is at the determined working distance is between zero-degrees and ninety-degrees in a direction of movement of the object.

In yet another case, the angle where the respective region is at the determined working distance is between zero-degrees and ninety-degrees in a direction opposite to a direction of movement of the object.

In yet another case, the angle where the respective region is at the determined working distance is between zero-degrees and ninety-degrees in a direction of movement of the object for regions located on downward sloping portions of the surface profile, and the angle where the respective region is at the determined working distance is between zero-degrees and ninety-degrees in a direction opposite to the direction of movement of the object for regions located on upward sloping portions of the surface profile.

In an aspect, there is provided a system for surface inspection of an object using an optical coherence tomography (OCT) system, the OCT system comprising an optical source to produce an optical beam, a beam splitter to direct a derivative of the optical beam to a reflective element and another derivative of the optical beam to the object via a scanner head and direct optical beams returned from the reflective element and the object to a detector for detection of an interference effect, the system for surface inspection comprising: a distance determination module to determine a surface profile of the object, the surface profile comprising one or more regions on a surface of the object; an object translator to move the object relative to the OCT scanner head; and a steering module to, for each of the one or more regions on the surface of the object, perform: determining a working distance where the surface of the object at the respective region is within a present depth of field; determining an angle where the respective region is at the determined working distance from an OCT scanner head; and directing the OCT scanner head at the determined angle towards the respective region when the respective region is at the determined working distance along the respective angle, the OCT system performing an A-scan when the respective region is within the present depth of field.

In a particular case, the distance determination module comprises a plurality of measurement devices to measure a plurality of distances between one or more fixed points and the surface of the object to generate the surface profile.

In another case, the one or more regions on the surface of the object comprise one or more regions in a first section of the surface profile, the surface profile comprising at least one subsequent section, each subsequent section comprising one or more subsequent regions, the steering module, for each one of the one or more subsequent regions, further performing: determining a working distance where the surface of the object at the respective subsequent region is within the present depth of field; determining an angle where the respective subsequent region is at the determined working distance from the OCT scanner head; and directing the OCT scanner head at the determined angle towards the respective subsequent region when the respective subsequent region is at the determined working distance along the respective angle, the OCT system performing an A-scan when the respective region is within the present depth of field.

In yet another case, the angle where the respective region is at the determined working distance is between zero-degrees and ninety-degrees in a direction of movement of the object.

In yet another case, the angle where the respective region is at the determined working distance is between zero-degrees and ninety-degrees in a direction opposite to a direction of movement of the object.

In yet another case, the angle where the respective region is at the determined working distance is between zero-degrees and ninety-degrees in a direction of movement of the object for regions located on downward sloping portions of the surface profile, and wherein the angle where the respective region is at the determined working distance is between zero-degrees and ninety-degrees in a direction opposite to the direction of movement of the object for regions located on upward sloping portions of the surface profile.

In yet another case, the beam steering device is selected from a group consisting of a mirror galvanometer, a single axis scanner, a microelectromechanical system (MEMs)-based scanning mechanism, and a rotating scanner.

In yet another case, an F-theta lens or telecentric lens is used in conjunction with the optical source.

In yet another case, at least a portion of the object has a modulating surface profile.

These and other aspects are contemplated and described herein. It will be appreciated that the foregoing summary sets out representative aspects of systems and methods to assist skilled readers in understanding the following detailed description.

BRIEF DESCRIPTION OF THE DRAWINGS

The features of the invention will become more apparent in the following detailed description in which reference is made to the appended drawings wherein:

FIG. 4A is a diagrammatic side view of a scanner head and object, according to the system of FIG. 1;

FIG. 4B is a diagrammatic side view of the scanner head and object of FIG. 4A at a later point in time;

FIG. 5A is a diagrammatic side view of a scanner head and object, according to the system of FIG. 1, at a first point in time;

FIG. 5B is a diagrammatic side view of a scanner head and object, according to the system of FIG. 1, at a second point in time;

FIG. 5C is a diagrammatic side view of a scanner head and object, according to the system of FIG. 1, at a third point in time;

FIG. 5D is a diagrammatic side view of a scanner head and object, according to the system of FIG. 1, at a fourth point in time;

FIG. 8A is an exemplary B-scan, in which the system determined there are no features present;

FIG. 8B is an exemplary B-scan, in which the system determined there are features present.

DETAILED DESCRIPTION

Figure 1:
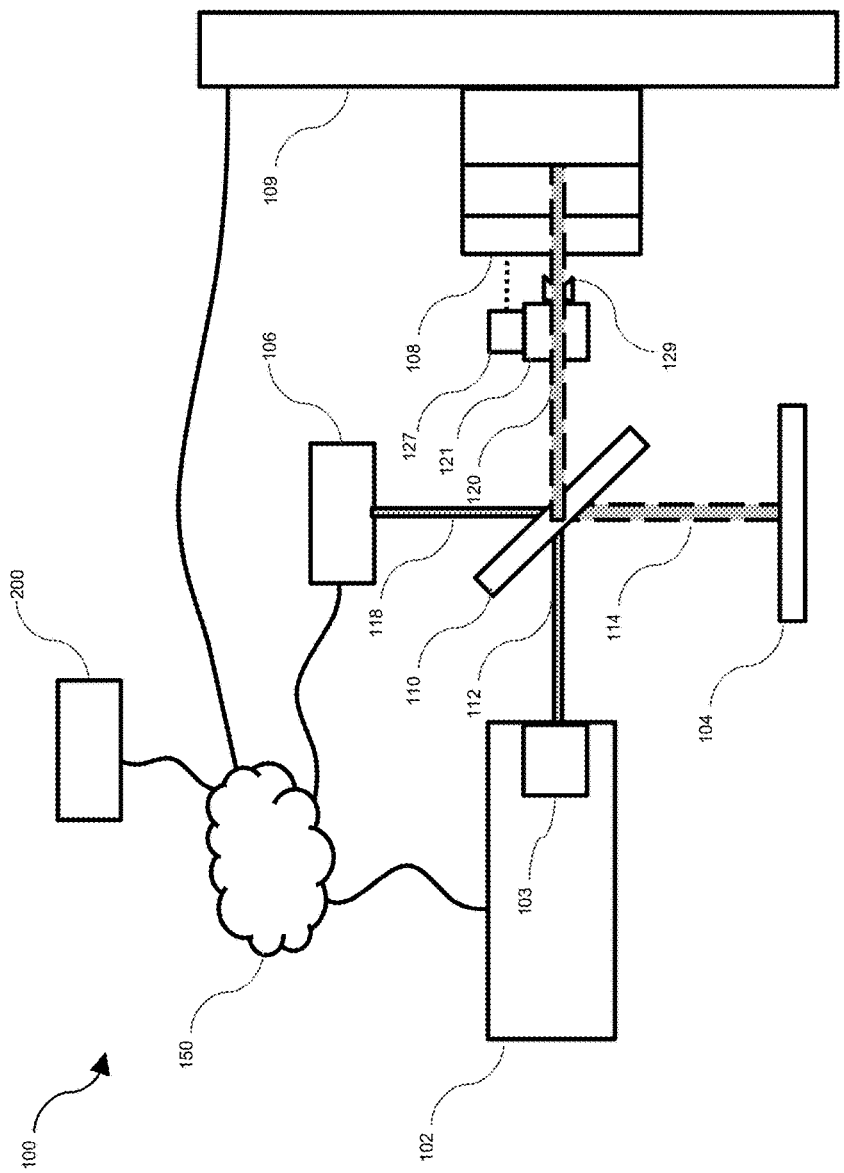
FIG. 1 is schematic diagram of an optical coherence tomography (OCT) system, according to an embodiment.

Embodiments will now be described with reference to the figures. For simplicity and clarity of illustration, where considered appropriate, reference numerals may be repeated among the Figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures and components have not been described in detail so as not to obscure the embodiments described herein. Also, the description is not to be considered as limiting the scope of the embodiments described herein.

Various terms used throughout the present description may be read and understood as follows, unless the context indicates otherwise: "or" as used throughout is inclusive, as though written "and/or"; singular articles and pronouns as used throughout include their plural forms, and vice versa; similarly, gendered pronouns include their counterpart pronouns so that pronouns should not be understood as limiting anything described herein to use, implementation, performance, etc. by a single gender; "exemplary" should be understood as "illustrative" or "exemplifying" and not necessarily as "preferred" over other embodiments. Further definitions for terms may be set out herein; these may apply to prior and subsequent instances of those terms, as will be understood from a reading of the present description.

Any module, unit, component, server, computer, terminal, engine or device exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of the device or accessible or connectable thereto. Further, unless the context clearly indicates otherwise, any processor or controller set out herein may be implemented as a singular processor or as a plurality of processors. The plurality of processors may be arrayed or distributed, and any processing function referred to herein may be carried out by one or by a plurality of processors, even though a single processor may be exemplified. Any method, application or module herein described may be implemented using computer readable/executable instructions that may be stored or otherwise held by such computer readable media and executed by the one or more processors.

The following relates generally to imaging and more specifically to a system and method for steerable focal adjustment for optical coherence tomography.

Optical coherence tomography (OCT), and particularly non-destructive OCT, is a technique for imaging in two or three-dimensions. OCT can provide a relatively high resolution, potentially up to few micrometers, and can have relatively deep penetration, potentially up to a few millimeters, in a scattering media.

OCT techniques can use back-scattered light from an object to generate information about that object; for example, generating a three-dimensional representation of that object when different regions of the object are imaged.

FIG. 1 illustrates a schematic diagram of an OCT system 100, according to an embodiment. The OCT system 100 includes an optical source (or photonic emitter) 102, a reflective element 104 (for example, a mirror), a beam splitter 110, and a detector (for example, a photodetector) 106. The diagram shows an object 108 with three layers of depth. The optical source 102 produces an originating optical beam (or path) 112 that is directed towards the beam splitter 110. The beam splitter 110 divides the originating beam 112 and directs one derivative beam, referred to herein as the reference beam (or path) 114, towards the reflective element 104 and another derivative beam, referred to herein as the sample beam (or path) 120, towards the object to be scanned 108. Both derivative beams 114, 120 are directed back to the beam splitter 110, and then directed as a resultant beam 118 to the detector 106. In some cases, one or more secondary mirrors (not shown) can be provided to reflect the sample beam 120 onto the object 108. In some cases, there may be a scanner head 121 to direct the sample beam 120 onto the object 108. In some embodiments, as described herein, the scanner head 121 can include a beam steering device 129 to direct light to the object 108. The beam steering device may be, for example, a mirror galvanometer in one or two dimensions, a single axis scanner, a microelectromechanical system (MEMs)-based scanning mechanism, a rotating scanner, or other suitable mechanism for beam steering. The beam steering device may be controlled electromechanically. In some cases, the scanner head 121 can also include a depth-of-field adjusting mechanism.

In some cases, the OCT system 100 can include a distance determination module 127 for determining the distance between the scanner head and the object 108. In an example, the distance determination module 127 can be an infrared line scanner, laser rangefinder, 3D laser scanner, radar based rangefinder, or the like. In some cases, the distance determination module 127 may be associated with, or separate from, the scanner head 121.

In some cases, the system 100 can include an amplification mechanism; for example, a doped fiber amplifier, a semiconductor amplifier, a Raman amplifier, a parametric amplifier, or the like. The amplification mechanism can be used to amplify the signal of the optical source 102 and/or to increase quantity of photons backscattered off the surface under inspection and collected on the detector 106. By using the amplification mechanism, sensitivity of the system 100 may be increased.

In some cases, the system 100 can include an object translator 109 to move the object relative to the sample beam 120 and/or the scanner head 121. The object translator 109 can be, for example, a conveyor system, a robotic system, or the like. The illustration of FIG. 1 is only diagrammatic as the optical paths can be comprised of optical cables, and as such, the system components can have any number of physical placements and arrangements.

The optical source 102 can be any light source suitable for use with an interferometric imaging modality; for example, a laser or light emitting diode (LED). Particularly, in some implementations, the optical source 102 can be a tunable laser the wavelength of which can be altered (i.e. swept) in a controlled manner; for example, to sweep a wide wavelength range (e.g. 110 nm) at high speed (e.g. 20 KHz). In a particular example, the tunable laser can have a centre wavelength of 1310 nm, wherein the wavelength of the emitted light is continuously scanned over a 110 nm range, with a scan rate of 20 kHz and a coherence length of over 10 mm. In a further embodiment, the optical source 102 may be a low coherence light source such as white light or an LED. As an example, using a low coherence light source can facilitate extraction of spectral information from the imaging data by distributing different optical frequencies onto a detector array (e.g. line array CCD) via a dispersive element, such as a prism, grating, or other suitable device. This can occur in a single exposure as information of the full depth scan can be acquired.

In some cases, the optical source 102 can include a collimator 103 for narrowing the originating beam 112. In further cases, further optics may be included in various stages of the system 100 to control or change the optical beams. Optics may include lenses or other optical devices suitable to control, guide, navigate, position, or the like, the light beam in a desired manner; as an example, an F-theta or telecentric lens may be included. Where an F-theta or telecentric lens is used, the planification can mean that the beam steering device 129 only has to compensate in the axial direction, along the z-axis of the optical beam, as described below.

In further cases, software techniques may be employed for correcting or affecting optical errors or signals.

The detector 106 can be any suitable photodetector. In a particular case, the detector 106 can be a balanced photodetector, which can have an increased signal to noise ratio. In further cases, the detector 106 may be a photoelectric-type photodetector, such as a charge-coupled device (CCD) or complementary metal-oxide semiconductor (CMOS). The detector 106 may operate by photoemission, photovoltaic, thermal, photochemical, or polarization mechanism, or other mechanism through which electromagnetic energy can be converted into an electrical signal. Upon receiving the resultant beam 118, the detector 106 can convert the radiance/intensity of the resultant beam 118 into an electrical signal. In some cases, the electrical signal may then be converted to a digital signal, and modified by signal conditioning techniques such as filtering and amplification. In some cases, the interference pattern corresponding to the backscattered light can be converted into a signal by the detector 106 via, for example, a high-speed digitizer.

The OCT system also includes a computing module 200. The computing module 200 may be locally communicatively linked or remotely communicatively linked, for example via a network 150, to one or more other elements of the system 100; for example, to the optical source 102, the detector 106, the object translator 109, the scanner head 121, the beam steering device 129, and the distance determination module 127. The computing module 200 may be used for processing and analysis of imaging data provided by the OCT system 100. In some cases, the computing module 200 may operate as a control system or controller, and in other cases, may be connected to a separate control system or controller. Further, the computing module 200 may host a user-accessible platform for invoking services, such as reporting and analysis services, and for providing computational resources to effect machine learning techniques on the imaging data.

Figure 2:
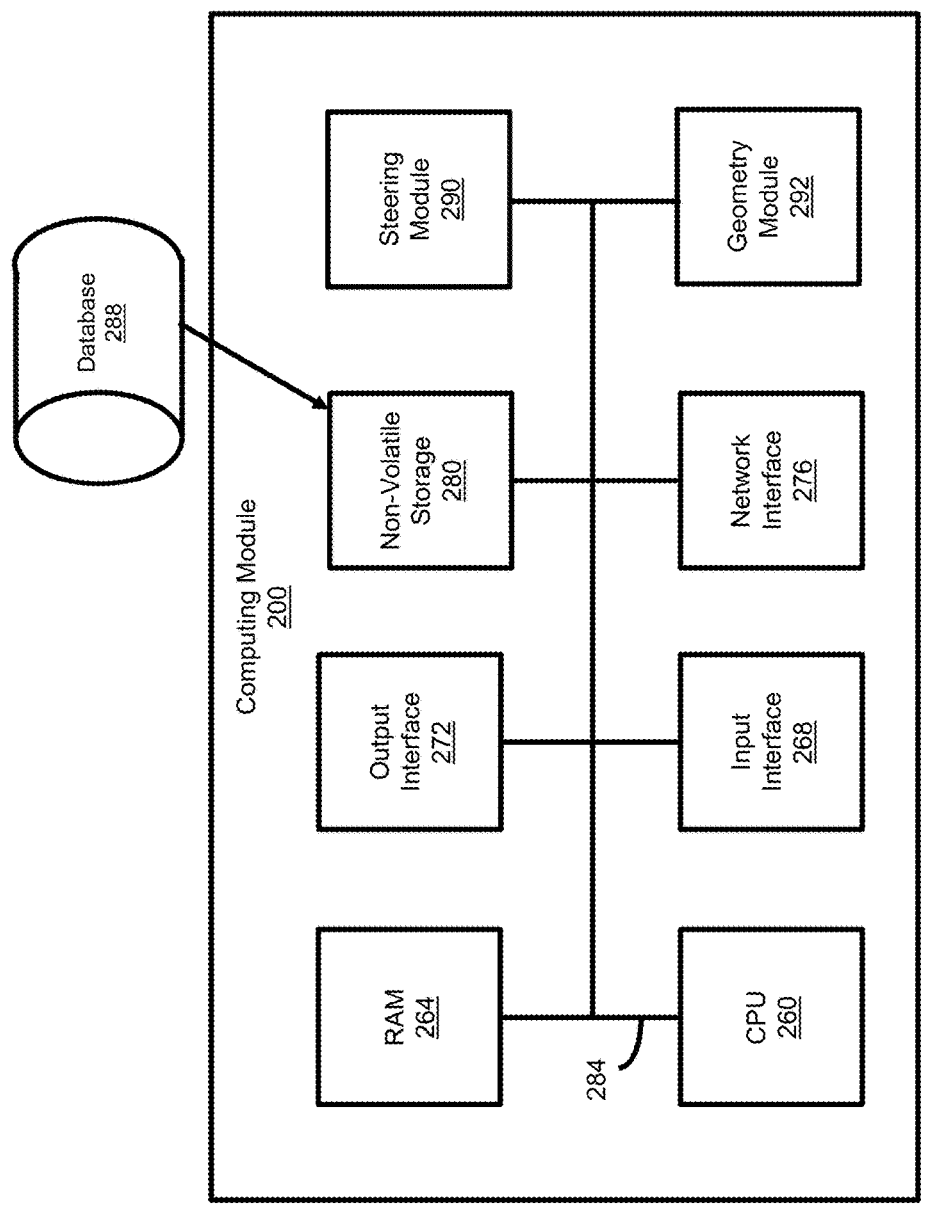
FIG. 2 is a schematic diagram for a computing module, according to the system of FIG. 1.

In an embodiment, as shown in FIG. 2, the computing module 200 can include a number of physical and logical components, including a central processing unit ("CPU") 260, random access memory ("RAM") 264, an input interface 268, an output interface 272, a network interface 276, non-volatile storage 280, and a local bus 284 enabling CPU 260 to communicate with the other components. CPU 260 can include one or more processors. RAM 264 provides relatively responsive volatile storage to CPU 260. The input interface 268 enables an administrator to provide input via, for example, a keyboard and mouse. The output interface 272 outputs information to output devices, for example, a display or speakers. The network interface 276 permits communication with other systems or computing devices. Non-volatile storage 280 stores the operating system and programs, including computer-executable instructions for implementing the OCT system 100 or analyzing data from the OCT system 100, as well as any derivative or related data. In some cases, this data can be stored in a database 288. During operation of the system 200, the operating system, the programs and the data may be retrieved from the non-volatile storage 280 and placed in RAM 264 to facilitate execution. In an embodiment, the CPU 260 can be configured to execute various modules, for example, a steering module 290 and a geometry module 292.

In some cases, the system 100 can use machine learning (ML) to transform raw data from the A-scan, B-scan, or C-scan into a descriptor. The descriptor is information associated with a particular defect in the object. The descriptor can then be used to determine a classifier for the defect. As an example, the CPU 260 can do this detection and classification with auto-encoders as part of a deep belief network.

OCT systems 100 generally use different localization techniques to obtain information in the axial direction, along the axis of the originating optical beam 112 (z-axis), and obtain information in the transverse direction, along a plane perpendicular to the axis of the originating beam 112 (x-y axes). Information gained from the axial direction can be determined by estimating the time delay of the optical beam reflected from structures or layers associated with the object 108. OCT systems 100 can indirectly measure the time delay of the optical beam using low-coherence interferometry.

OCT systems that employ low-coherence interferometers can use an optical source 102 that produces an optical beam 112 with a broad optical bandwidth. The originating optical beam 112 coming out of the source 102 can be split by the beam splitter 110 into two derivative beams (or paths). The first derivative beam 114 can be referred to as the reference beam (or path or arm) and the second derivative beam 120 can be referred to as the sample beam (or path or arm) of the interferometer. Each derivative beam 114, 120 is reflected back and combined at the detector 106.

The detector 106 can detect an interference effect (fast modulations in intensity) if the time travelled by each derivative beam in the reference arm and sample arm are approximately equal; whereby "equal" generally means a difference of less than a 'coherence length.' Thus, the presence of interference serves as a relative measure of distance travelled by light on the sample arm.

For OCT, the reference arm can be scanned in a controlled manner, and the reference beam 114 can be recorded at the detector 106. An interference pattern can be detected when the mirror 104 is nearly equidistant to one of the reflecting structures or layers associated with the object 108. The detected distance between two locations where the interference occurs corresponds to the optical distance between two reflecting structures or layers of the object in the path of the beam. Advantageously, even though the optical beam can pass through different structures or layers in the object, OCT can be used to separate out the amount of reflections from individual structures or layers in the path of the optical beam.

With respect to obtaining information in the transverse direction, as described below, the sample beam 120 can be focused on a small area of the object 108, potentially on the order of a few microns, and successively scanned over a section of the object 108.

In an embodiment of an OCT system, Fourier-domain can be used as a potentially efficient approach for implementation of low-coherence interferometry. Instead of recording intensity at different locations of the reference reflective element 104, intensity can be detected as a function of wavelengths or frequencies of the optical beam 112. In this case, intensity modulations, as a function of frequency, are referred to as spectral interference. Whereby, a rate of variation of intensity over different frequencies can be indicative of a location of the different reflecting structures or layers associated with the object. A Fourier transform of spectral interference information can then be used to provide information similar to information obtained from scanning of the reflective element 104.

In an embodiment of an OCT system, spectral interference can be obtained using either, or both, of spectral-domain techniques and swept-source techniques. With the spectral-domain technique, the optical beam can be split into different wavelengths and detected by the detector 106 using spectrometry. In the swept-source technique, the optical beam produced by the optical source 102 can sweep through a range of optical wavelengths, with a temporal output of the detector 106 being converted to spectral interference.

Advantageously, employing Fourier-domain can allow for faster imaging because back reflections from the object can be measured simultaneously.

The resolution of the axial and transverse information can be considered independent. Axial resolution is generally related to the bandwidth, or the coherence-length, of the originating beam 112. In the case of a Gaussian spectrum, the axial resolution ($\Delta z$) can be: $\Delta z = 0.44 * \lambda_0^2 / \Delta \lambda$, where $\lambda_0$ is the central wavelength of the optical beam and $\Delta \lambda$ is the bandwidth defined as full-width-half-maximum of the originating beam. In other cases, for spectrum of arbitrary shape, the axial spread function can be estimated as required.

In some cases, the depth of the topography imaging for an OCT system is typically limited by the depth of penetration of the optical beam into the object 108, and in some cases, by the finite number of pixels and optical resolution of the spectrometer associated with the detector 106. Generally, total length or maximum imaging depth $z_{max}$ is determined by the full spectral bandwidth $\lambda_{full}$ of the spectrometer and is expressed by $z_{max}=(\frac{1}{4}N)*(\lambda_0^2/\lambda_{full})$ where N is the total number of pixels of the spectrometer.

With OCT systems, sensitivity is generally dependent on the distance, and thus delay, of reflection. Sensitivity is generally related to depth by: $R(z)=\sin(p*z)/(p*z)*\exp(-z^2/(w*p))$. Where w depends on the optical resolution of spectrometer associated with the detector 106. The first term related to the finite pixels in the spectrometer and the second term related to the finite optical resolution of the spectrometer.

When implementing the OCT system 100, reflected sample and reference optical beams that are outside of the coherence length will theoretically not interfere. This reflectivity profile, called an A-scan, contains information about the spatial dimensions, layers and location of structures within the object 108 of varying axial-depths; where the 'axial' direction is along the axis of the optical beam path. A cross-sectional tomograph, called a B-scan, may be achieved by laterally combining a series of adjacent A-scans along an axis orthogonal to the axial direction. A B-scan can be considered a slice of the volume being imaged. One can then further combine a series of adjacent B-scans to form a volume which is called a C-scan. Once an imaging volume has been so composed, a tomograph, or slice, can be computed along any arbitrary plane in the volume.

A-scans represent an intensity profile of the object, and its values (or profile) characterize reflectance of the way the optical beam penetrates the surface of the object. Thus, such scans can be used to characterize the material from the surface of the object to some depth, at an approximately single region 131 of the object 108. As used in the present disclosure, the term 'surface', of an object, is understood to include the peripheral surface down to the depth of penetration of the A-scan. B-scans can be used to provide material characterization from the surface of the object 108 to some depth, across a contour on the surface of the object 108.

The system 100, as described herein, can be used to detect features associated with the surface and subsurface of an object; and in some cases, for later categorization of such features. In a particular case, such features are defects in the object, due to, for example, various manufacturing-related errors or conditions.

Figure 6:
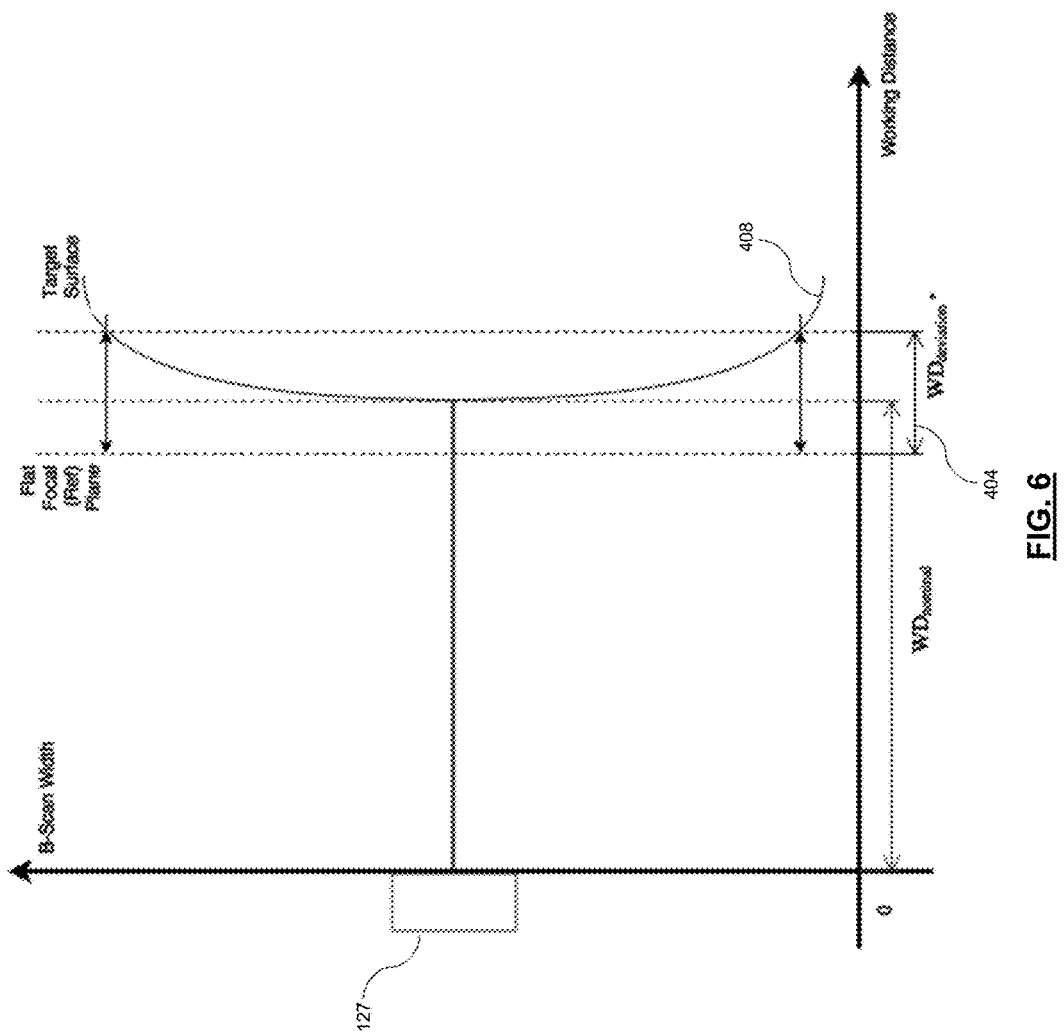
FIG. 6 is a diagrammatic side view of a scanner head and object, according to the system of FIG. 1, showing a focal reference plane.

In many circumstances, the object to be scanned by the OCT system 100 is not flat and can have a curved or otherwise modulating surface or profile. FIGS. 4A and 4B show a portion of an object 408 having a curved surface to be scanned; and in some cases, the curved surface may be considered monotonic. FIG. 4A illustrates a scanner head 121 scanning the object 408 at a first instance of time and FIG. 4B shows such scanner head 121 scanning the object 408 at a later instance of time. In this case, the object 408 is moved in the direction illustrated by arrow 407 relative to the fixed scanner head 121. The scanner head 121 is directed at the object 408 and includes the beam steering device 129. A present working distance ("WD") 402 is illustrated as the distance between the scanner head 121 or the beam steering device 129 and the surface of the object 408. A present depth of field 404 (or "confocal parameter" if the beam is assumed to be Gaussian) is also illustrated and represents the distance over which the surface of the object 408 is in focus during the A-scan. Depth of field, as used herein, is understood to be a distance about a plane of focus ("POF") in which objects in an image appear sufficiently sharp, and thus, the objects are in focus. In some cases, as exemplified in greater detail in FIG. 6, the upper boundary of the depth of field 404, being the boundary closest to the scanner head 121, can be called a focal reference plane. The lower boundary of the depth of field 404, being the boundary farthest from the scanner head 121, can be called the working distance deviation.

As shown in FIG. 4B, as the object is moved along its direction of travel, the working distance 402 can increase or decrease due to the modulations in the profile of the object 408; in this case, the working distance 402 increased as the surface became further away from the scanner head 121 along the axial direction. As shown in FIG. 4B, the increase was such that the depth of field 404 no longer includes the surface of the object 408 within operational focus.

One approach to resolve the above problem is to adjust the path length of the reference arm 114. In an example, this can include having the reflective element 104 on a motorized mechanism that translates the mirror along the axial direction of the reference beam 114 in order to shorten or lengthen the path length. In another example, this can include incorporating a liquid lens in the reference path 114 in order to change the effective reference path length. However, adjusting the path length may be inadequate for applications where the object is moving relative to the scanner head, due to computational and speed concerns.

In the present embodiments, the system 100 can use the beam steering device 129 to change the working distance of the sample beam 120 to keep the surface of the object 408 in focus and thus adjust for the changes in the profile of the surface of the object 408. As shown in FIGS. 5A to 5D, as the object 408 is moved along in direction 407 relative to the scanner head 121, the beam steering device 129 changes the working distance 402 of the sample beam 120 to keep the surface of the object 408 in focus.

As shown in FIGS. 5A to 5D, the beam steering device 129 steers the beam along angle denoted by "θ" from the vertical. Then, in some cases, the depth of field 404 can be adjusted by the depth-of-field adjusting mechanism 125 in order to ensure that the surface of the object 408 is within the depth of field.

Figure 3:
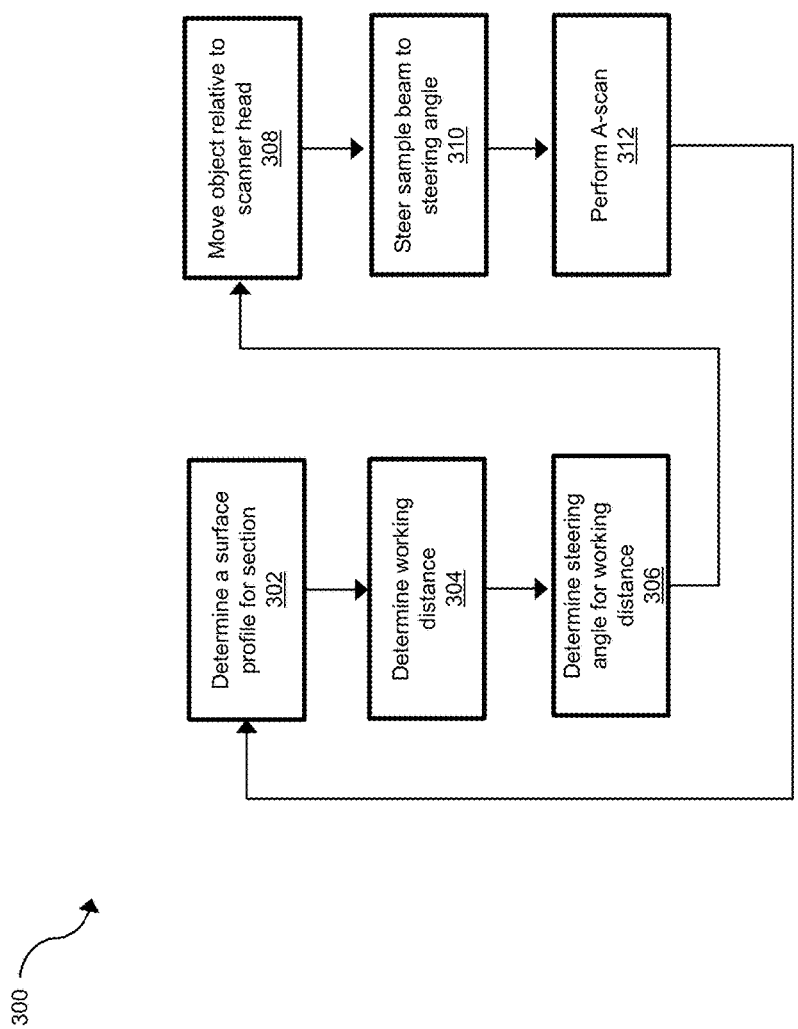
FIG. 3 is a flowchart for a method for surface inspection of an object using optical coherence tomography (OCT), according to an embodiment.

Referring now to FIG. 3, shown therein is a method 300 of surface inspection using the OCT system 100, in accordance with an embodiment. The method 300 may be used for inspecting the surface of an object 408 when the object 408 is moved relative to the scanner head 121. In an exemplary case, the method can be used for the purposes of detecting surface defects or irregularities. The method 300 uses the fact that a working distance between the scanner head 121 and the surface of the object 408 is correlated with depth of field 404; whereby the surface can be brought into focus by selecting an appropriate working distance. Advantageously, the method 300 accomplishes such working distance modification by angling of the sample beam 120 by the beam steering device 129, which is relatively quick and efficient, especially important in circumstances where the object 408 is moved relative to the scanner head 121. Conventional approaches, such as having to linearly actuate the scanner head in the axial direction, are typically too slow for such an application. As another intended advantage, the method 300 does not require changing of depth of field with a depth of field adjusting device. As such, the overall costs and complexity of the system 100 can be significantly reduced.

At block 302, the distance determination module 127 determines a surface profile for a first section of the object 408. Each section of the object's 408 surface includes one or more regions 131 for scanning, whereby each region 131 has at least one A-scan performed at that location, as described herein. In some cases, where the surface profile of the whole object can be determined at block 302, the object 408 can be considered to comprise one section. Determining the surface profile includes determining the spatial distance between the scanner head 121 and one or more regions 131 on the surface of the object 408; the one or more regions 131 being located in the first section. The first section of the surface is in advance of the scanner head 121 along the surface of the object 408 in the direction opposite of the direction of travel 407. In this way, the geometry module 292 can make a determination of the geometry of the surface of the object 408 for determining working distance, as described below.

In an embodiment, the surface profile can be determined by measurement via one or more distance determination modules 127. While in some cases the one or more distance determination modules 127 can measure the distance between the scanner head 121 and the surface of the object 408, generally, the one or more distance determination modules 127 can measure the distance between any fixed point and the surface of the object 408. In further embodiments, distance can be determined by the geometry module 292 by, for example, retrieving the surface geometry of the object 408 from the database 288 or from the input interface 268. In some cases, the one or more distance determination modules 127 can comprise the geometry module 292 or perform its functions. As an example, the surface geometry can be derived from a CAD model of the object 408. Upon processing the object's surface geometry, the geometry module 292 can determine the spatial distance for each region 131 of the object's 408 surface. In further embodiments, the system 100 can use a combination of distance measurement and predetermined geometry to determine the spatial distance; for example, using geometric information to anticipate larger variations in the surface profile by the geometry module 292 and utilizing the distance determination module 127 for greater accuracy. In some embodiments, the measured spatial distances of the object 408 can be stored in the database 288 for retrieval by the geometry module 292 during a subsequent scanning of an identical or similar object.

At block 304, the steering module 290 determines, for every region 131 in the section of the object's 408 surface, a working distance 402 in which the surface is in focus, where in focus meaning that the surface is within a present depth of field. In some cases, each region 131 can be in the range of approximately 100 to 1000 microns apart. In a particular case, each region 131 is approximately 200 microns apart.

At block 306, for each of the one or more regions, the steering module 290 determines a steering angle from the vertical, denoted as "θ" in the examples of FIGS. 5A to 5D, in which the respective region 131 is at the determined working distance 402 away from the scanner head 121.

At block 308, the object 408 is moved relative to the scanner head 121. In further cases, the object 408 can be continuously moved, or repeatedly moved and stopped.

At block 310, as the object 408 moves relative to the scanner head 121, for each of the one or more regions 131, the steering module 290 directs the beam steering device 129 to steer the sample beam 120 such that the sample beam 120 is directed at the respective region 131, when such region 131 is at the appropriate working distance from the scanner head 121 along the respective steering angle θ.

At block 312, for each of the one or more regions, the system 100 performs an A-scan, as described herein, when the respective region 131 is in focus.

The system 100 repeats blocks 302 to 312 for each successive section of the surface of the object 408. The A-scans of method 300 can be aggregated by the computing module 200. The aggregation technique may involve stacking images comprising the imaging data according to image processing techniques. In an embodiment, aggregation of imaging data may include the formation of a B-scan from a plurality of A-scans. In some cases, the B-scan and/or A-scans are presented to a user via the output interface 272.

In some embodiments, as shown in FIGS. 5A and 5B, the steering module 290 can select steering angles θ that are between the vertical and ninety-degrees in the direction of the object's movement 407. In this case, the beam steering device 129 can wait for the region 131 to pass by the scanner head 121 in order for the sample beam 120 to reach the desired steering angle θ and therefore working distance 402. In other embodiments, as shown in FIGS. 5C and 5D, the steering module 290 can select steering angles θ that are between the vertical and ninety-degrees in the direction opposite the object's movement 407. In this case, the beam steering device 129 can angle the sample beam 120 at the region 131 prior to the region 131 passing by the scanner head 121, in order to reach the desired steering angle θ and therefore working distance 402. In further embodiments, the beam steering device 129 can angle the sample beam 120 either towards or opposite the object's direction of movement 407. As an example, as shown in FIGS. 5A to 5D, the beam steering device 129 can angle the sample beam 120 towards the direction of movement 407 to focus on regions 131 located on downward sloping surface sections, and angle the sample beam 120 opposite the direction of movement 407 to focus on regions 131 located on upward sloping surface sections.

In method 300, it is generally understood that the surface of the object 408 being in 'focus' includes approximately the totality of the A-scan axial depth being in focus (i.e., within the boundaries of the depth of field 404).

Advantageously, the approach described herein does not require that the depth of field be changed mechanically, which can be costly or complex, but instead only requires the appropriate angling of the sample beam, as the object is moved, to bring the surface into focus.

In some embodiments, the working distance can be determined by analysis of the A-scan to determine if the object 408 is within the depth of field 404. However, this approach is limited in speed and responsiveness, especially where the object is moved relative to the scanner head, due to having to analyze the A-scan and then having to retake the A-scan if it is not in focus. Advantageously, the method 300 measures the working distance, and brings the surface into focus, prior to the A-scan; such that it is faster and more efficient, and is able to scan an object 408 in movement.

While in the present embodiments the object is described as 'moving' via the object translator 109, it is appreciated that moving can include successively moving and stopping the object 108 for scanning. Additionally, while in the present embodiments, the movement is shown along a single dimensional axis, it is appreciated that the movement of the object can be along a two-dimensional plane.

In some embodiments, the beam steering device 129 may not be capable of adjusting the sample beam angle quickly enough for each A-scan. In this case, the system 100 can take an A-scan at the appropriate speed of the beam steering device 129 and use digital signal processing or machine learning techniques to fill in for the missing intermediate A-scans in the aggregated B-scan.

In some cases, after the A-scans, B-scans, and/or C-scans have been determined, the system can detect whether there are defects in the object using image interpretation and machine learning techniques. The defective label indicates that an unacceptable defect has been detected, and in some cases, such defect is of a particular type. In the example where the object is a vehicle part, the defect may have different shapes and dimensions. As an example, the defect may be an unwanted round seed or crater, or the like, on or under the surface of the part. As another example, the defect may have an elongated shape, such as with an unwanted fiber, or the like, on or under the surface of the part. As an example, the acceptable/defective label may be with regards to the size, area, or volume of a defect. In another example, acceptable/defective label may be with regards to the presence of defect between different layers of films applied in an industrial process; for example, in an automotive setting, in an electro-deposition (ED) layer, a colour layer, or a clear layer, where each layer is in the order of tens of microns thick.

In some cases, based on analysis of the OCT images, the system 100 can provide further information in the form of feature localization on the object. As an example, the information may be that there is fiber defect at location x=3.4 cm, y=5.6 cm on a vehicle part. Feature localization can also be specified with respect to surface depth, along the z-axis. Depth localization can be particularly advantageous in certain applications; for example, when thin films are being applied to a vehicle part. In this case, for example, after a vehicle part is painted, paint inspection may be required on various layers including an electro-deposition layer, a colour layer, and a clear coat layer. Being able to detect and determine the presence of a defect between any two of these layers is particularly advantageous because it has implications on the amount of re-work that may be required to resolve the imperfection. It can also be advantageous for improvement to a manufacturing process by being able to determine what type of defect is located at what layer; for example, a faulty HVAC system in the manufacturing environment could be responsible for introducing defects between layers. In this regard, being able to localize defect origin to a portion of the manufacturing path is an advantage to reduce future defects and rework.

The machine-learning techniques described herein may be implemented by providing input data to a neural network, such as a feed-forward neural network, for generating at least one output. The neural network may have a plurality of processing nodes, including a multi-variable input layer having a plurality of input nodes, at least one hidden layer of nodes, and an output layer having at least one output node. During operation of a neural network, each of the nodes in the hidden layer applies a function and a weight to any input arriving at that node (from the input layer or from another layer of the hidden layer), and the node may provide an output to other nodes (of the hidden layer or to the output layer). The neural network may be configured to perform a regression analysis providing a continuous output, or a classification analysis to classify data. The neural networks may be trained using supervised or unsupervised learning techniques. According to a supervised learning technique, a training dataset is provided at the input layer in conjunction with a set of known output values at the output layer; for example, imaging data for which defect location and/or existence is known. During a training stage, the neural network may process the training dataset. It is intended that the neural network learn how to provide an output for new input data by generalizing the information it learns in the training stage from the training data. Training may be effected by backpropagating error to determine weights of the nodes of the hidden layers to minimize the error. The training dataset, and the other data described herein, can be stored in the database 288 or otherwise accessible to the computing module 200. Once trained, or optionally during training, test data can be provided to the neural network to provide an output. The neural network may thus cross-correlate inputs provided to the input layer in order to provide at least one output at the output layer. Preferably, the output provided by the neural network in each embodiment will be close to a desired output for a given input, such that the neural network satisfactorily processes the input data.

In some embodiments, the machine learning techniques can employ, at least in part, a long short-term memory (LSTM) machine learning approach. The LSTM neural network allows for quickly and efficiently performing group feature selections and classifications.

In some embodiments, the detection can be by employing, at least in part, a convolutional neural network (CNN) machine learning approach.

While certain machine-learning approaches are described, specifically LSTM and CNN, it is appreciated that, in some cases, other suitable machine learning approaches may be used where appropriate.

Figure 7A:
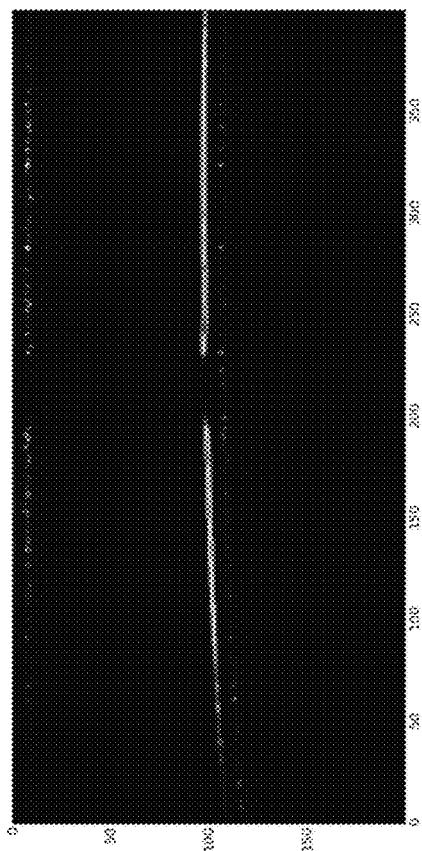
FIG. 7A is an exemplary B-scan in which a defect was detected in a paint layer of a vehicle part.
Figure 7B:
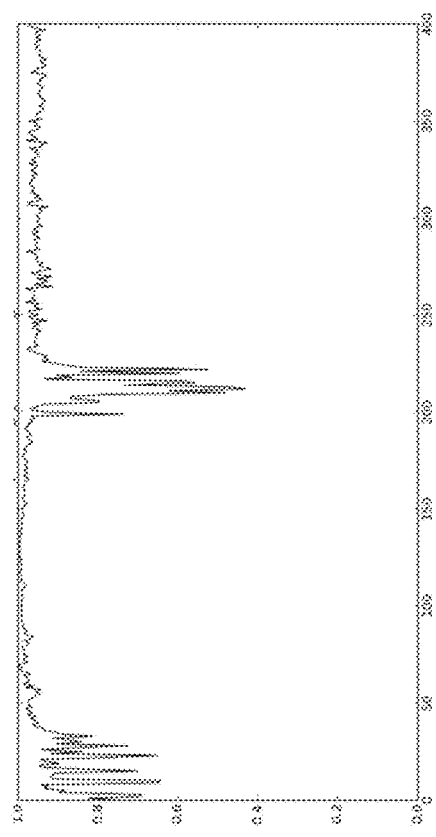
FIG. 7B is a plot of a score produced for the exemplary B-scan of FIG. 7A.

As an example, FIG. 7A illustrates a B-scan in which a defect was detected in a paint layer of a vehicle part. As shown, the defect is centered at approximately $225 \times 10^{-2}$ mm along the fast scan axis (x-axis). Correspondingly, FIG. 7B illustrates a plot of a score produced by the CPU 260, between 0 and 1, representing a determined possibility that a defect is present in the exemplary B-scan of FIG. 7A.

As an example, FIG. 8A illustrates a B-scan in which contours are outlined. In this case, the CPU 260 determined that there was no defect detected on the object. FIG. 8B also illustrates a B-scan in which contours are outlined. In this case, the CPU 260 determined that there was a defect detected on the object.

Figure 9:
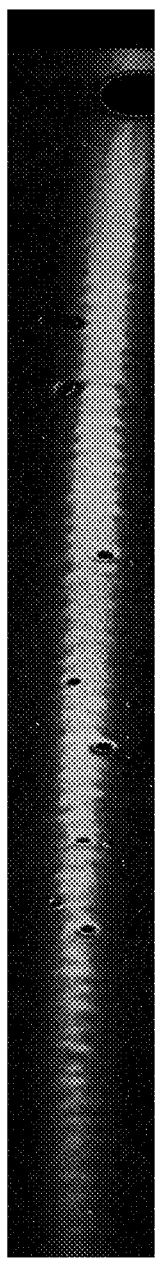
FIG. 9 is an exemplary image captured to form a top-level surface view of an object.

FIG. 9 illustrates an exemplary image captured to form a top-level surface view of an object.

Figures 10A, 10B:
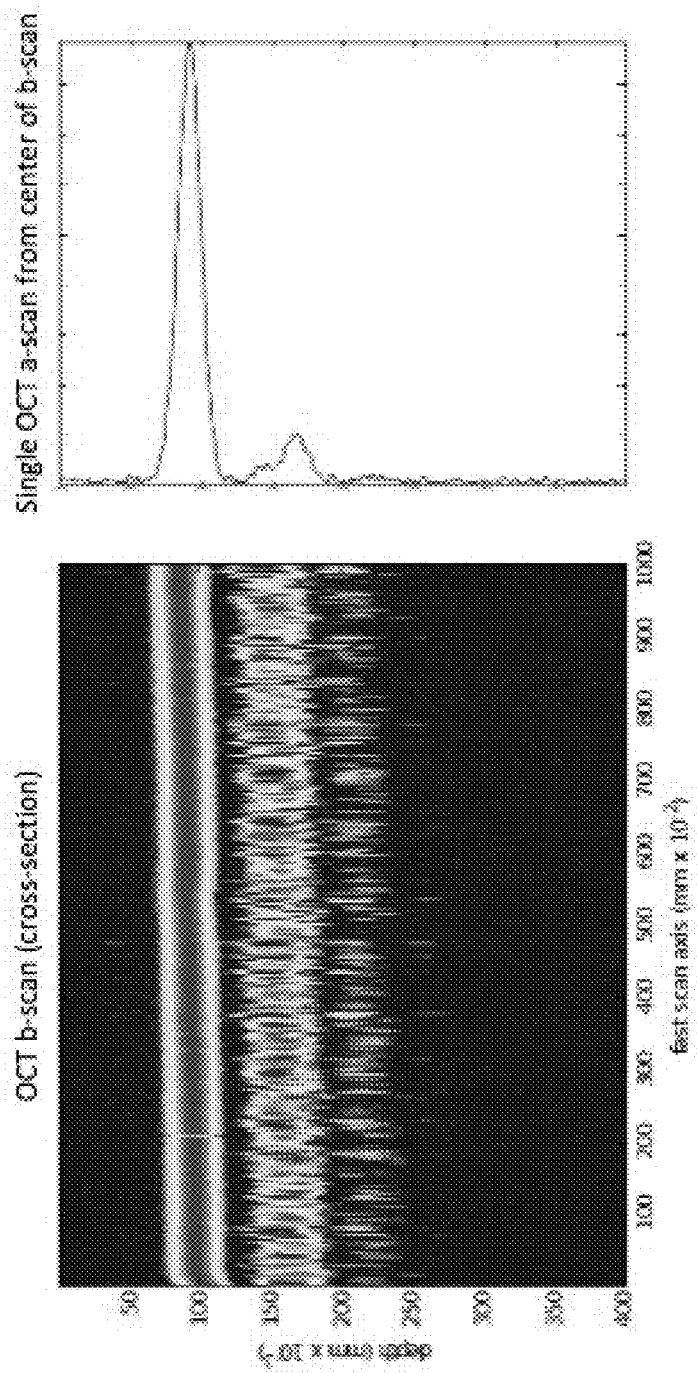
FIG. 10A is an exemplary B-scan of an object without problematic defects or features.
FIG. 10B is an exemplary A-scan.

FIG. 10A illustrates an exemplary B-scan (cross-section) of an object without problematic defects or features (i.e., a 'clean' surface). FIG. 10B illustrates an exemplary A-scan from the center of the B-scan of FIG. 10A.

Figure 11:
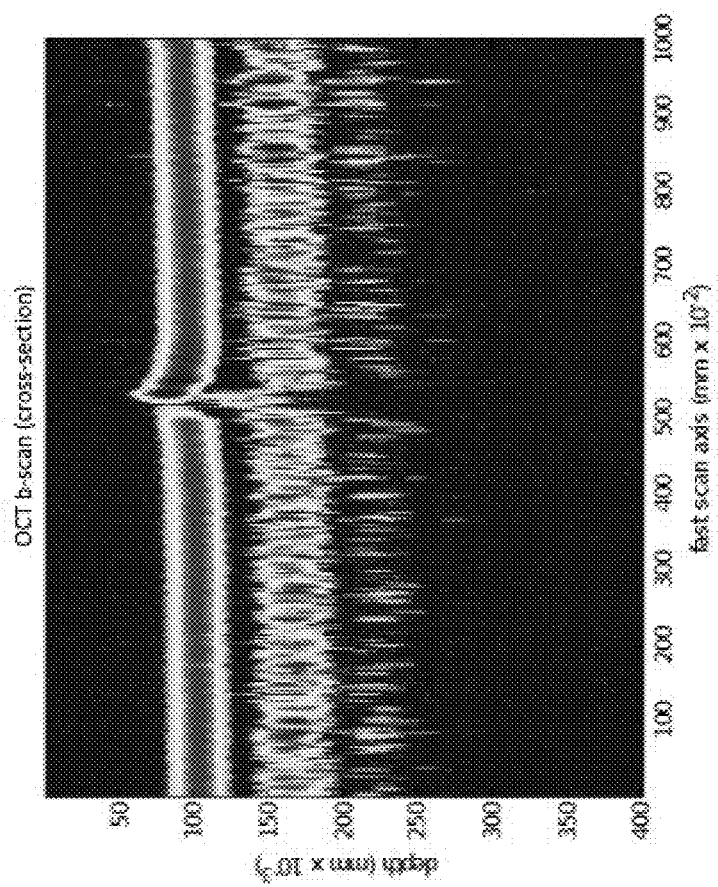
FIG. 11 is an exemplary B-scan of an object with problematic defects or features.

FIG. 11 illustrates an exemplary B-scan (cross-section) of an object with a problematic defect or feature present. In this case, as shown, there was a subsurface seed detected, centered at approximately 500 along the x-axis.

Figure 12:
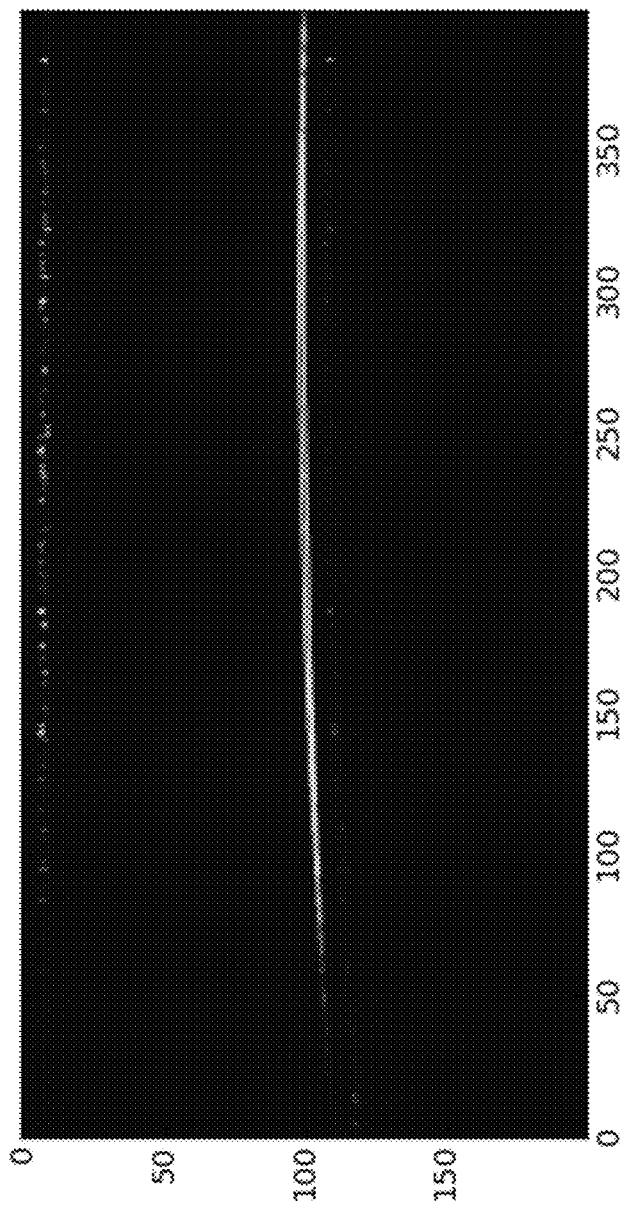
FIG. 12 is an exemplary B-scan of an object for determining whether there are defects.
Figure 13:
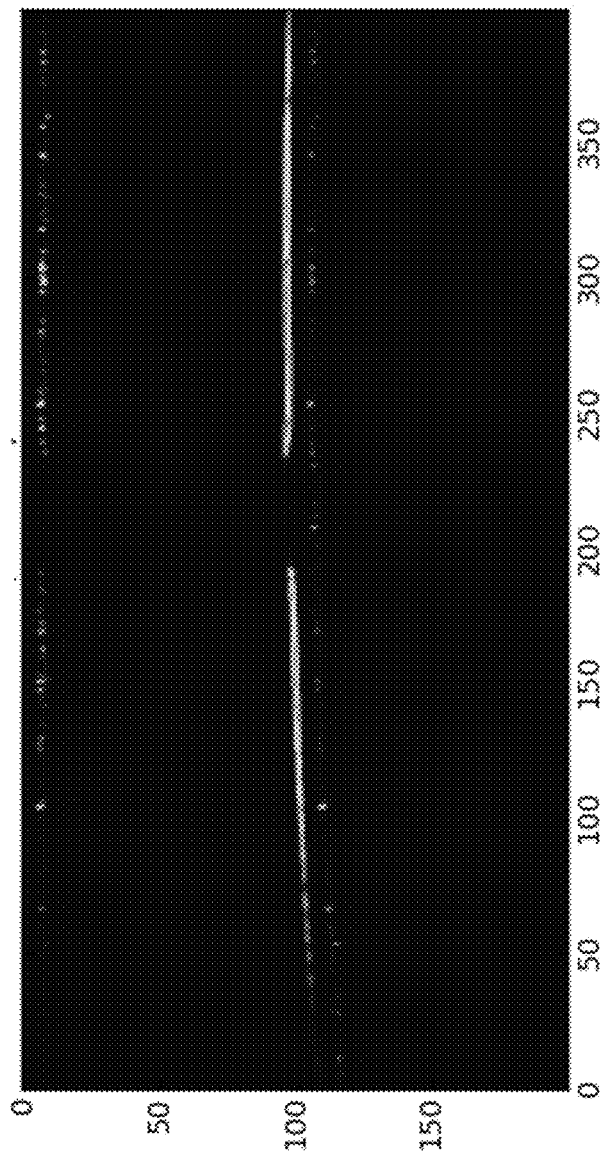
FIG. 13 is an exemplary B-scan of an object showing a defect.

FIG. 12 illustrates an exemplary B-scan of a vehicle part for determining whether there are painting defects. In this case, there was no defect from the B-scan. FIG. 13 illustrates an exemplary B-scan of a vehicle part for determining whether there are painting defects. In this case, as shown, there was a defect in the paint layer detected, centered at approximately 225 along the x-axis.

Figure 14B:
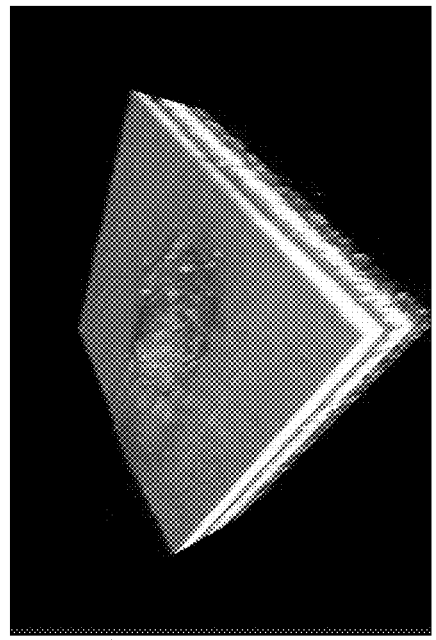
FIGS. 14A and 14B are exemplary C-scans at respectively different angles of perspective.
Figure 14A:
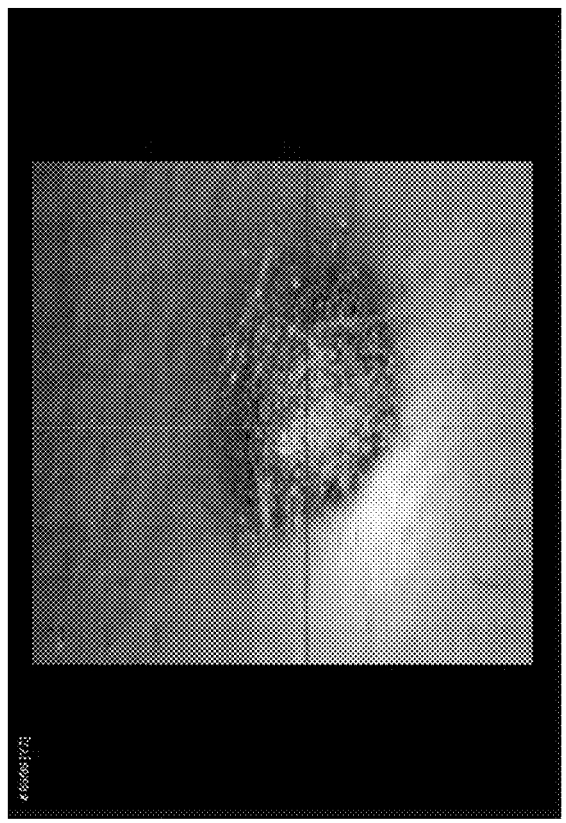

FIGS. 14A and 14B illustrate, at respectively different angles of perspective, an exemplary C-scan of a vehicle part. In this case, a seed was detected as a defect in the painting of a vehicle part.

In further embodiments, machine learning can also be used by the CPU 260 to detect and compensate for data acquisition errors at the A-scan, B-scan and C-scan levels.

While the present embodiments refer to the "vertical" as the downwards direction, it should be understood that "vertical" can be replaced with any reference angle that is approximately a direct line between the scanner head and the object, whatever orientation such reference angle may have.

Although the invention has been described with reference to certain specific embodiments, various modifications thereof will be apparent to those skilled in the art without departing from the spirit and scope of the invention as outlined in the claims appended hereto. The entire disclosures of all references recited above are incorporated herein by reference.

The invention claimed is:

1. A method of surface inspection of an object using optical coherence tomography (OCT), the method comprising:
    determining a surface profile of the object, the surface profile comprising one or more regions on a surface of the object;
    moving the object relative to the OCT scanner head; and
    for each of the one or more regions on the surface of the object, performing:
        determining a working distance where the surface of the object at the respective region is within a present depth of field;
        determining an angle where the respective region is at the determined working distance from an OCT scanner head;
        directing the OCT scanner head at the determined angle towards the respective region when the respective region is at the determined working distance along the respective angle; and
        performing an A-scan of the object when the respective region is within the present depth of field.

2. The method of claim 1, wherein moving the object relative to the OCT scanner head comprises continuously moving the object.

3. The method of claim 1, wherein the one or more regions on the surface of the object comprise one or more regions in a first section of the surface profile, the surface profile comprising at least one subsequent section, each subsequent section comprising one or more subsequent regions, the method further comprising, for each one of the one or more subsequent regions, performing:
    determining a working distance where the surface of the object at the respective subsequent region is within the present depth of field;
    determining an angle where the respective subsequent region is at the determined working distance from the OCT scanner head;
    directing the OCT scanner head at the determined angle towards the respective subsequent region when the respective subsequent region is at the determined working distance along the respective angle; and
    performing an A-scan of the object when the respective subsequent region is within the present depth of field.

4. The method of claim 1, wherein at least a portion of the object has a curved surface profile.

5. The method of claim 1, wherein determining the surface profile of the object comprises measuring a plurality of distances between a fixed point and the surface of the object.

6. The method of claim 1, further comprising retrieving a surface geometry of the object from a database and wherein determining the surface profile of the object comprises determining a distance between the scanner head and the surface of the object from the surface geometry of the object.

7. The method of claim 1, wherein the one or more regions are approximately 100 to 1000 microns away from an adjacent region.

8. The method of claim 7, wherein the one or more regions are approximately 200 microns away from the adjacent region.

9. The method of claim 1, wherein the angle where the respective region is at the determined working distance is between zero-degrees and ninety-degrees in a direction of movement of the object.

10. The method of claim 1, wherein the angle where the respective region is at the determined working distance is between zero-degrees and ninety-degrees in a direction opposite to a direction of movement of the object.

11. The method of claim 1, wherein the angle where the respective region is at the determined working distance is between zero-degrees and ninety-degrees in a direction of movement of the object for regions located on downward sloping portions of the surface profile, and wherein the angle where the respective region is at the determined working distance is between zero-degrees and ninety-degrees in a direction opposite to the direction of movement of the object for regions located on upward sloping portions of the surface profile.

12. A system for surface inspection of an object using an optical coherence tomography (OCT) system, the OCT system comprising an optical source to produce an optical beam, a beam splitter to direct a derivative of the optical beam to a reflective element and another derivative of the optical beam to the object via a scanner head and direct optical beams returned from the reflective element and the object to a detector for detection of an interference effect, the system for surface inspection comprising:
    a distance determination module to determine a surface profile of the object, the surface profile comprising one or more regions on a surface of the object;
    an object translator to move the object relative to the OCT scanner head; and
    a steering module to, for each of the one or more regions on the surface of the object, perform:
        determining a working distance where the surface of the object at the respective region is within a present depth of field;
        determining an angle where the respective region is at the determined working distance from an OCT scanner head; and
        directing the OCT scanner head at the determined angle towards the respective region when the respective region is at the determined working distance along the respective angle, the OCT system performing an A-scan when the respective region is within the present depth of field.

13. The system of claim 12, wherein the distance determination module comprises a plurality of measurement devices to measure a plurality of distances between one or more fixed points and the surface of the object to generate the surface profile.

14. The system of claim 12, wherein the one or more regions on the surface of the object comprise one or more regions in a first section of the surface profile, the surface profile comprising at least one subsequent section, each subsequent section comprising one or more subsequent regions, the steering module, for each one of the one or more subsequent regions, further performing:
    determining a working distance where the surface of the object at the respective subsequent region is within the present depth of field;

determining an angle where the respective subsequent region is at the determined working distance from the OCT scanner head; and directing the OCT scanner head at the determined angle towards the respective subsequent region when the respective subsequent region is at the determined working distance along the respective angle, the OCT system performing an A-scan when the respective region is within the present depth of field.

15. The system of claim 12, wherein the angle where the respective region is at the determined working distance is between zero-degrees and ninety-degrees in a direction of movement of the object.

16. The system of claim 12, wherein the angle where the respective region is at the determined working distance is between zero-degrees and ninety-degrees in a direction opposite to a direction of movement of the object.

17. The system of claim 12, wherein the angle where the respective region is at the determined working distance is between zero-degrees and ninety-degrees in a direction of movement of the object for regions located on downward sloping portions of the surface profile, and wherein the angle where the respective region is at the determined working distance is between zero-degrees and ninety-degrees in a direction opposite to the direction of movement of the object for regions located on upward sloping portions of the surface profile.

18. The system of claim 12, wherein the beam steering device is selected from a group consisting of a mirror galvanometer, a single axis scanner, a microelectromechanical system (MEMs)-based scanning mechanism, and a rotating scanner.

19. The system of claim 12, wherein an F-theta lens or telecentric lens is used in conjunction with the optical source.

20. The system of claim 12, wherein at least a portion of the object has a modulating surface profile.

* * * * *